US012358762B2

(12) United States Patent
Matsui et al.

(10) Patent No.: US 12,358,762 B2
(45) Date of Patent: Jul. 15, 2025

(54) CRANE

(71) Applicant: KOBELCO CONSTRUCTION MACHINERY CO., LTD., Hiroshima (JP)

(72) Inventors: Dairo Matsui, Hyogo (JP); Akira Koyahata, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 237 days.

(21) Appl. No.: 18/253,159

(22) PCT Filed: Nov. 26, 2021

(86) PCT No.: PCT/JP2021/043382
§ 371 (c)(1),
(2) Date: May 16, 2023

(87) PCT Pub. No.: WO2022/124097
PCT Pub. Date: Jun. 16, 2022

(65) Prior Publication Data

US 2023/0416058 A1 Dec. 28, 2023

(30) Foreign Application Priority Data

Dec. 8, 2020 (JP) ................................ 2020-203551

(51) Int. Cl.
*B66C 13/54* (2006.01)

(52) U.S. Cl.
CPC .................................. *B66C 13/54* (2013.01)

(58) Field of Classification Search
CPC ................................ B66C 13/52; B66D 13/54
See application file for complete search history.

(56) References Cited

U.S. PATENT DOCUMENTS 7,004,337 B2 * 2/2006 Lissandre .............. B66C 13/54 212/175
10,358,174 B2 * 7/2019 Yamada ................. B66C 13/54
2015/0225210 A1 * 8/2015 Resch .................... B66C 13/54 296/190.04

FOREIGN PATENT DOCUMENTS

CN 102408066 A 4/2012
CN 202542723 U 11/2021
(Continued)

OTHER PUBLICATIONS

Extended European Search Report issued Mar. 26, 2024, in corresponding European Patent Application No. 21903201.8, 5 pages.
(Continued)

*Primary Examiner* — Anna M Momper
*Assistant Examiner* — Nathaniel L Adams
(74) *Attorney, Agent, or Firm* — Oblon, McClelland, Maier & Neustadt, L.L.P.

(57) ABSTRACT

A crane includes a connector that supports a cab in such a manner that a position of the cab relative to a frame is changeable between an operation position and a transportation position. The connector has a lower swing arm attached to a lower arm attachment part below a first boom attachment part swingably about a swing axis located behind the first boom attachment part and an upper swing arm attached to an upper arm attachment part above the first boom attachment part swingably about the swing axis.

6 Claims, 8 Drawing Sheets

(56) References Cited

FOREIGN PATENT DOCUMENTS

| | | | | |
|---|---|---|---|---|
| JP | 2000281277 | A | * | 10/2000 |
| JP | 2001-048470 | A | | 2/2001 |
| JP | 2006-168941 | A | | 6/2006 |
| JP | 2009040599 | A | * | 2/2009 |
| JP | 2014040722 | A | * | 3/2014 |
| JP | 2017-506202 | A | | 3/2017 |

OTHER PUBLICATIONS

International Search Report mailed on Feb. 8, 2022 in PCT/JP2021/043382 filed on Nov. 26, 2021 (2 pages).

* cited by examiner

CRANE

TECHNICAL FIELD

The present disclosure relates to a crane that enables changing of a position of a cab relative to a frame included in a machine body.

BACKGROUND ART

The crane includes a machine body and a boom tiltably attached to the machine body. In a case where the crane is a crawler crane, the machine body includes a lower traveling body of a self-running type and an upper stewing body. In a case where the crane is a stationary crane, the machine body includes an untravellable base and an upper stewing body. The upper stewing body includes: a frame (stewing frame) slewably supported on the lower traveling body or the base; and a cab supported on the stewing frame.

Such a crane as the crawler crane and the stationary crane is prohibited from traveling on a public road, and thus is transported by a trailer. For transportation of the crane, the crane is disassembled into several components so that a width of the components constituting a part of the crane to be transported falls within a range of regulation value for the transportation.

By contrast, for a crane operation by the crane, the cab is in an operation position deviating lateralward (e.g., rightward) from the stewing frame in a front portion of the upper stewing body so that an operator sitting on an operator seat in the cab has good visibility. Components including a stewing frame and a cab in a relatively large crane may have a width exceeding the regulation value when the cab is in the operation position. The crane of this size has a swing function of changing the position of the cab relative to the stewing frame from the operation position to the transportation position for transportation (e.g., Patent Literature 1). Specifically, the cab is supported on the stewing frame by a swing arm ("cab member" in Patent Literature 1), and shifts between the operation position and the transportation position owing to the swinging of the swing arm to the stewing frame. Arrangement of the cab in the transportation position by using the swing function allows the width of the components including the stewing frame and the cab to fall within the range of regulation value. This enables transportation of the components by the trailer.

The boom performs a rising or lowering action, or a tilting action, with respect to the upper stewing body. Normally, a proximal end of the boom is attached to the stewing frame rotatably upward and downward in the front portion of the upper slewing body, and the cab is in a position deviating lateralward from the Mewing frame in the front portion of the upper slewing body as described above. A boom attachment part (boom foot) via which the proximal end of the boom is attached to the slewing frame, and the swing arm are adjacent to each other in the front portion of the upper slewing body. For instance, Patent Literature 1 describes a crane including a swing arm located below a boom attachment part so as not to hinder a tilting action of the boom (FIG. 1 and FIG. 2 of Patent Literature 1).

Meanwhile, the swing arm needs to have enough strength to support the cab, and thus, the swing al in inevitably has a large dimension in a height direction thereof. Along with the large dimension, the boom attachment part is located at a higher height position above the swing arm, and a proximal end of the boom attached to the boom attachment part is located at a higher height position as well. As each of the boom attachment part and the proximal end of the boom to the slewing frame is located at a higher height position, a force (acting force) acting from the boom onto the boom attachment part increases. The boom attachment part thus needs to ensure enough strength to withstand the acting force. This causes an increase in the dimension of the boom attachment part and is unfavorable in terms of a dimensional regulation in transportation. Such an increase in the dimension of a member like the boom attachment part leads to an increase in the weight of the member. The increase in the weight of the member may further cause a cost increase accompanied by the necessity of a larger trailer for transportation, and may result in an excess of a transportation weight limit.

CITATION LIST

Patent Literature

Patent Literature 1: Japanese Unexamined Patent Publication No. 2006-168941

SUMMARY OF INVENTION

This disclosure has been achieved in consideration of the drawbacks described above, and has an object of providing a crane that enables changing of a position of a cab relative to a frame of an upper slewing body between an operation position and a transportation position while ensuring enough strength to support the cab without allowing a boom attachment part to be at a higher height position.

Provided is a crane including: a machine body including a frame, a cab, and a connector that connects the frame and the cab to each other, the frame having a first boom attachment part and a second boom attachment part lying next to each other at a distance therebetween in a left-right direction; and a boom having a proximal end attached to the first boom attachment part and the second boom attachment part tiltably to the machine body. The connector is supported on the frame swingably to the frame, and the connector supports the cab in such a manner that a position of the cab relative to the frame is changeable between an operation position and a transportation position. The operation position is a position of the cab in a crane operation and deviates outward in the left-right direction from the first boom attachment part to avoid contact between the cab and the boom in the crane operation. The transportation position is a position of the cab in transportation of a part of the machine body including the cab, the connector, and at least a portion of the frame in a state where the boom is detached from the first boom attachment part and the second boom attachment part, the transportation position being in front of the first boom attachment part. The frame further has a lower arm attachment part located below and in the rear of the first boom attachment part and an upper arm attachment part located above and in the rear of the first boom attachment part. The connector has a lower swing aini attached to the lower arm attachment part below the first boom attachment part swingably about a swing axis located behind the first boom attachment part and an upper swing arm attached to the upper arm attachment part above the first boom attachment part swingably about the swing axis, the upper swing arm being at such a position as to avoid contact with the boom when the cab is in the operation position.

DESCRIPTION OF EMBODIMENTS

Hereinafter, a crane according to an embodiment will be described with reference to accompanying drawings.

Overall Configuration of a Crane

Figure 1:
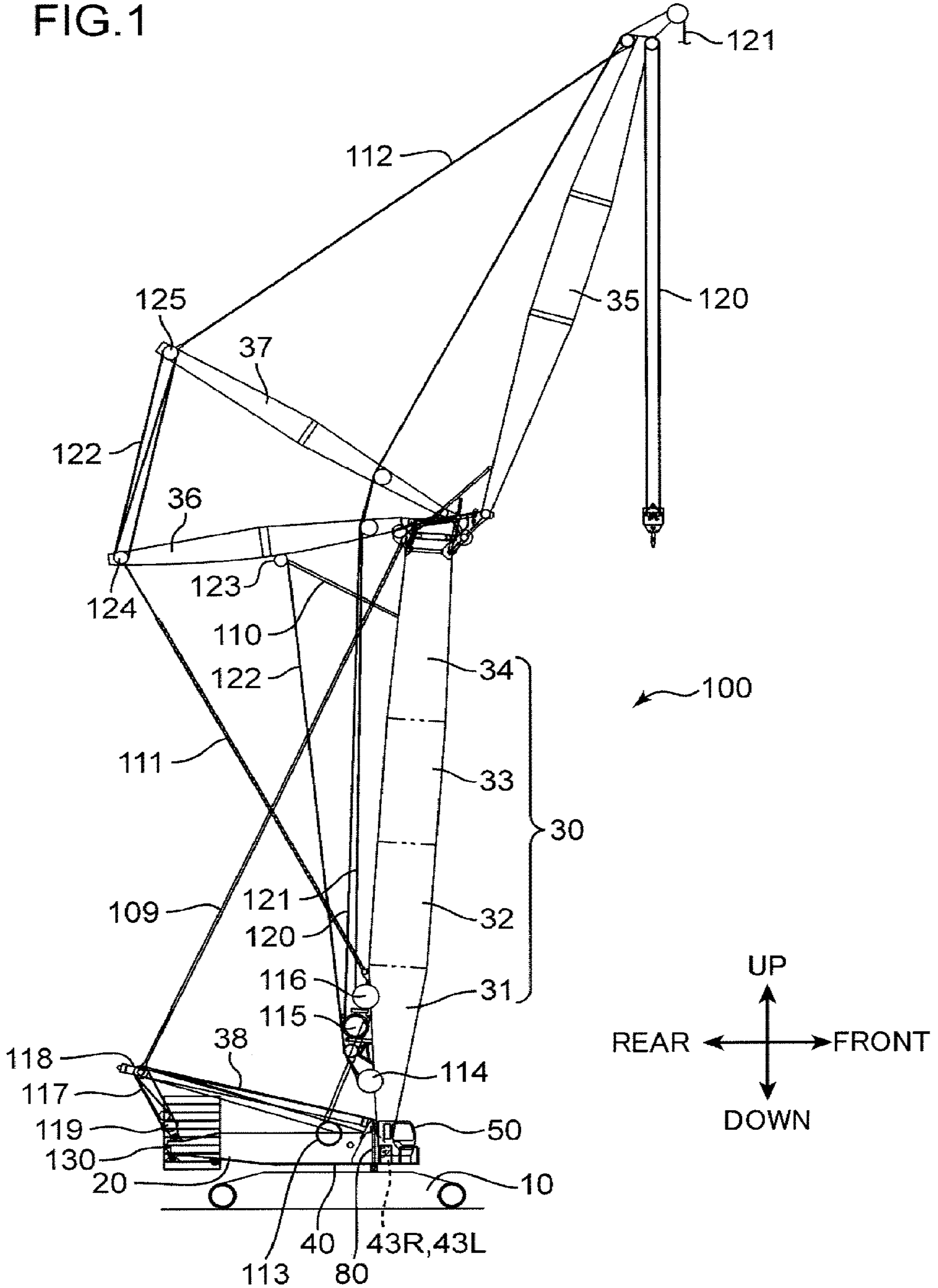
FIG. 1 is a side view of a crane according to an embodiment.

FIG. 1 is a side view of a crane 100 according to an embodiment. As illustrated in FIG. 1, the crane 100 includes: a lower traveling body 10; an upper slewing body 20 slewably supported on the lower traveling body 10; a boom 30; a jib 35; a rear strut 36; a front strut 37; and a mast 38. The lower traveling body 10 and the upper slewing body 20 serve as an example of a machine body.

The upper slewing body 20 includes a stewing frame 40, a cab 50, a connector 80, and a counterweight 130. The stewing frame 40 has a bottom plate 48 (see FIG. 3 to be referred to later) extending below the upper slewing body 20 in a longitudinal direction (front-rear direction) of the upper slewing body 20. The slewing frame 40 is slewably attached to the lower traveling body 10. The slewing frame 40 has a pair of right boom attachment parts 43R, 43R and a pair of left boom attachment parts 43L, 43L, to which a proximal end of the boom 30 is attached. Each of the two right boom attachment parts 43R, 43R serves as an example of the first boom attachment part, and each of the two left boom attachment parts 43L, 43L serves as an example of the second boom attachment part. The boom attachment parts 43R, 43L will be described in detail later.

The cab 50 is provided in a front-right portion of the upper slewing body 20. The cab accommodates an operator seat that allows an operator to sit thereon, a manipulation device including a manipulation lever that receives a manipulation from the operator, and other element. The connector 80 connects the slewing frame 40 and the cab 50 to each other. The counterweight 130 is provided in a rear portion of the upper slewing body 20 to adjust a balance of the crane 100. Each of the front-rear direction and the left-right direction denoted in each drawing is defined on the basis of a direction in which the cab 50 is oriented when the cab 50 is in an operation position P1 to be described later.

The boom 30 is supported on the upper slewing body 20 tiltably to the upper slewing body 20. The boom 30 has the proximal end being one end in a longitudinal direction, and a distal end being another end opposite to the proximal end. The proximal end of the boom 30 is rotatably and detachably attached to the boom attachment parts 43R, 43L. The boom 30 rotates about the proximal end in a tilting direction to the upper slewing body 20.

The boom 30 includes a plurality of boom members. The boom members include, for example, a first boom member 31, a second boom member 32, a third boom member 33, and a fourth boom member 34. The first boom member 31 includes the proximal end attached to the boom attachment part 43R, 43L, and the fourth boom member 34 includes the distal end. Each of the second and third boom members 32, 33 is an intermediate boom member located between the first boom member 31 and the fourth boom member 34. The first to fourth boom members 31 to 34 are connected in this order to constitute the boom 30.

The jib 35 is rotatably connected to the distal end of the boom 30, i.e., the distal end of the fourth boom member 34. The mast 38 is a member for rotating the boom 30, and the rear strut 36 and the front strut 37 are members for rotating the jib 35.

The mast 38 has a proximal end supported by the upper slewing body 20 rotatably in the same direction as the tilting direction of the boom 30, and a distal end opposite to the proximal end. The distal end is connected to the distal end of the boom 30 via a pair of left and right boom guy lines 109.

The rear strut 36 and the front strut 37 are rotatably supported at the distal end of the boom 30. The rear strut 36 is held in a posture extending out from the distal end of the boom 30 toward a boom raising direction (on the left side in FIG. 1) by a pair of left and right backstops 110 and a guy link 111. The front strut 37 is connected to the jib 35 via a pair of left and right jib guy lines 112 rotatably in cooperation with (integrally with) the jib 35.

The upper slewing body 20 has a plurality of winches. The winches include a boom raising and lowering winch 113, a jib raising and lowering winch 114, a main winch 115, and an auxiliary winch 116.

The boom raising and lowering winch 113 winds up and out a boom raising and lowering rope 117 to rotate the mast 38, thereby raising and lowering the boom 30. The boom raising and lowering rope 117 extends over sheave blocks 118, 119 respectively provided at a rotational end of the mast 38 and a rear end of the upper slewing body 20.

The jib raising and lowering winch 114 winds up and out a jib raising and lowering rope 122 extending between the rear strut 36 and the front strut 37 to rotate the front strut 37, thereby raising and lowering the jib 35. The jib raising and lowering rope 122 is supported on a guide sheave 123 provided at a middle portion of the rear strut 36 in a longitudinal direction thereof, and extends over sheave blocks 124, 125 respectively provided at a rotational end of the rear strut 36 and a rotational end of the front strut 37.

The main winch 115 performs hoisting and lowering of a hanged load to be hanged from a distal end of the jib 35 via a main rope 120, and the auxiliary winch 116 performs hoisting and lowering of a hanged load to be hanged from the distal end of the jib 35 via an auxiliary rope 121.

Connection Structure of the Frame and the Cab

Figure 2:
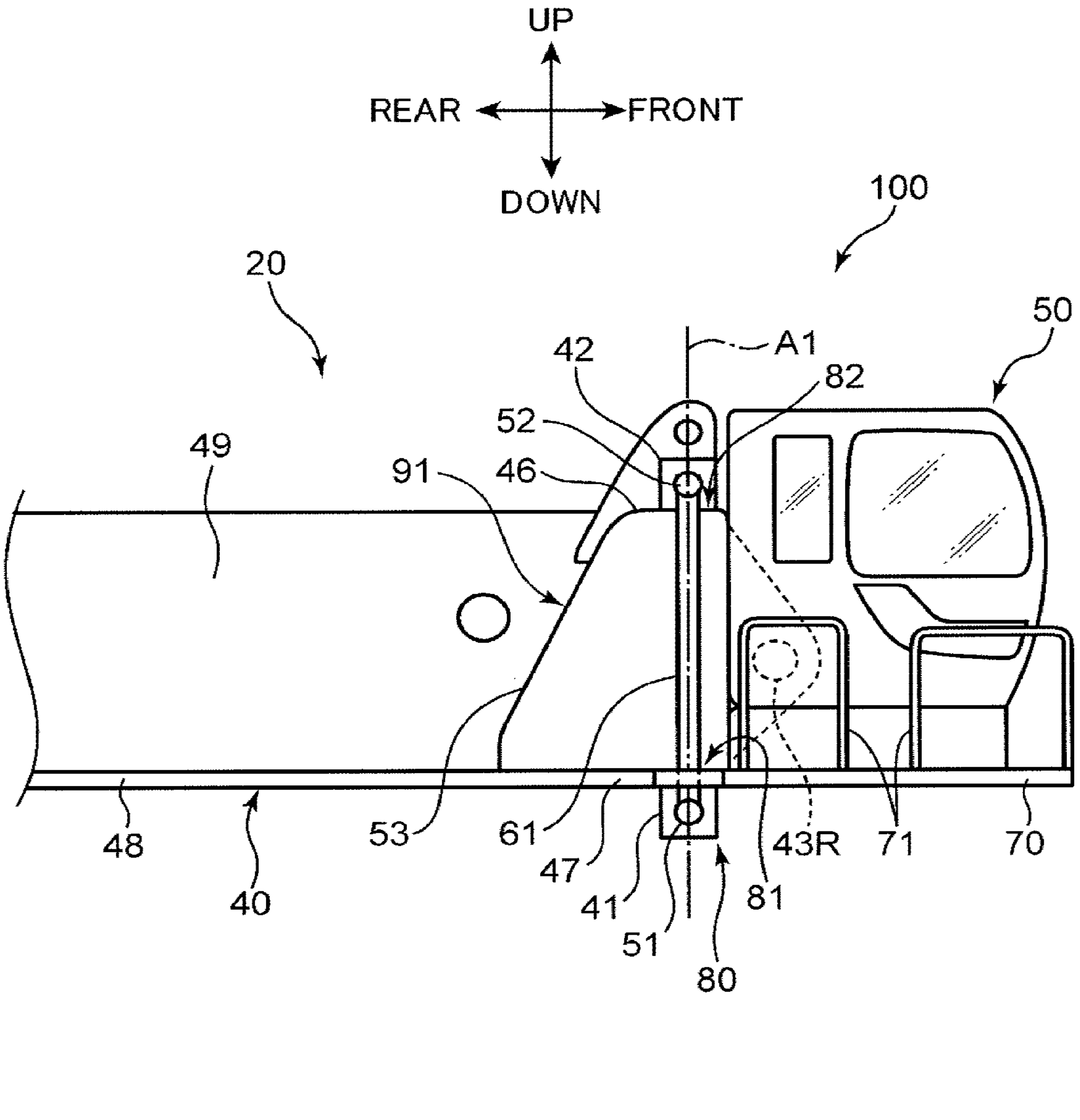
FIG. 2 is an enlarged side view of a part of an upper slewing body of the crane.
Figure 3:
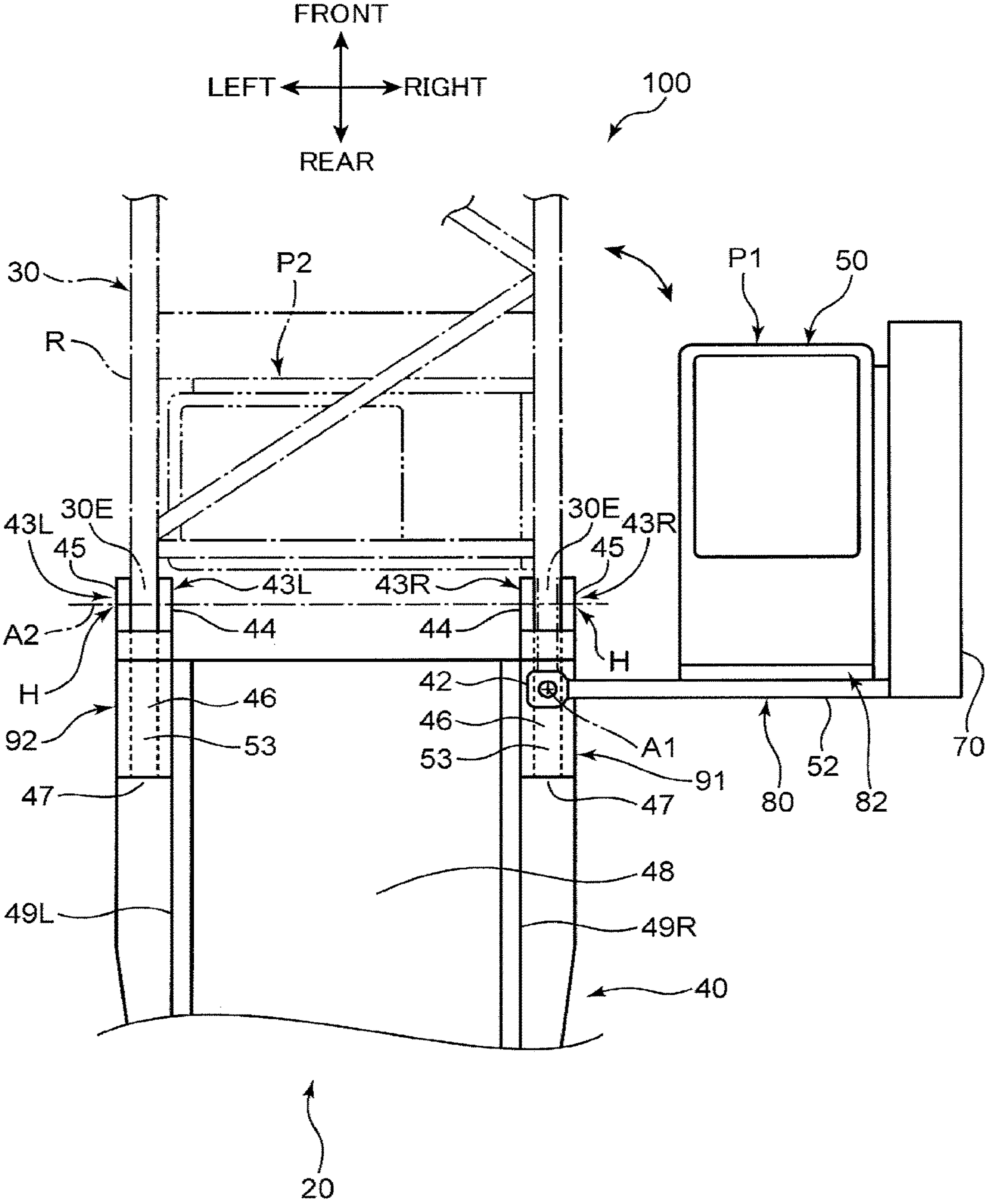
FIG. 3 is a plan view of a slewing frame of the upper slewing body, a cab, and a connector that connects these components to each other.
Figure 4:
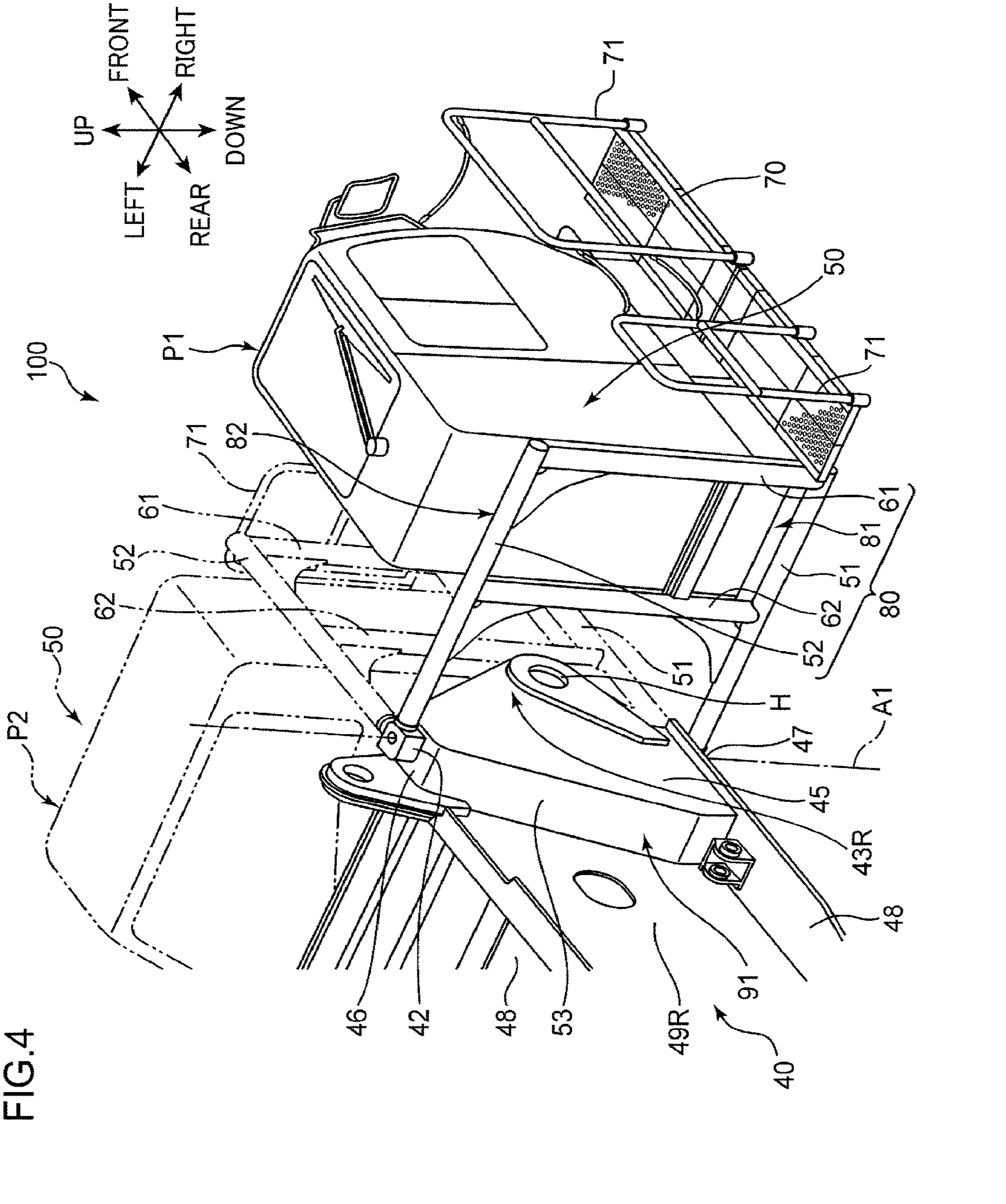
FIG. 4 is a perspective view of the slewing frame of the upper slewing body, the cab, and the connector that connects these components to each other.
Figure 5:
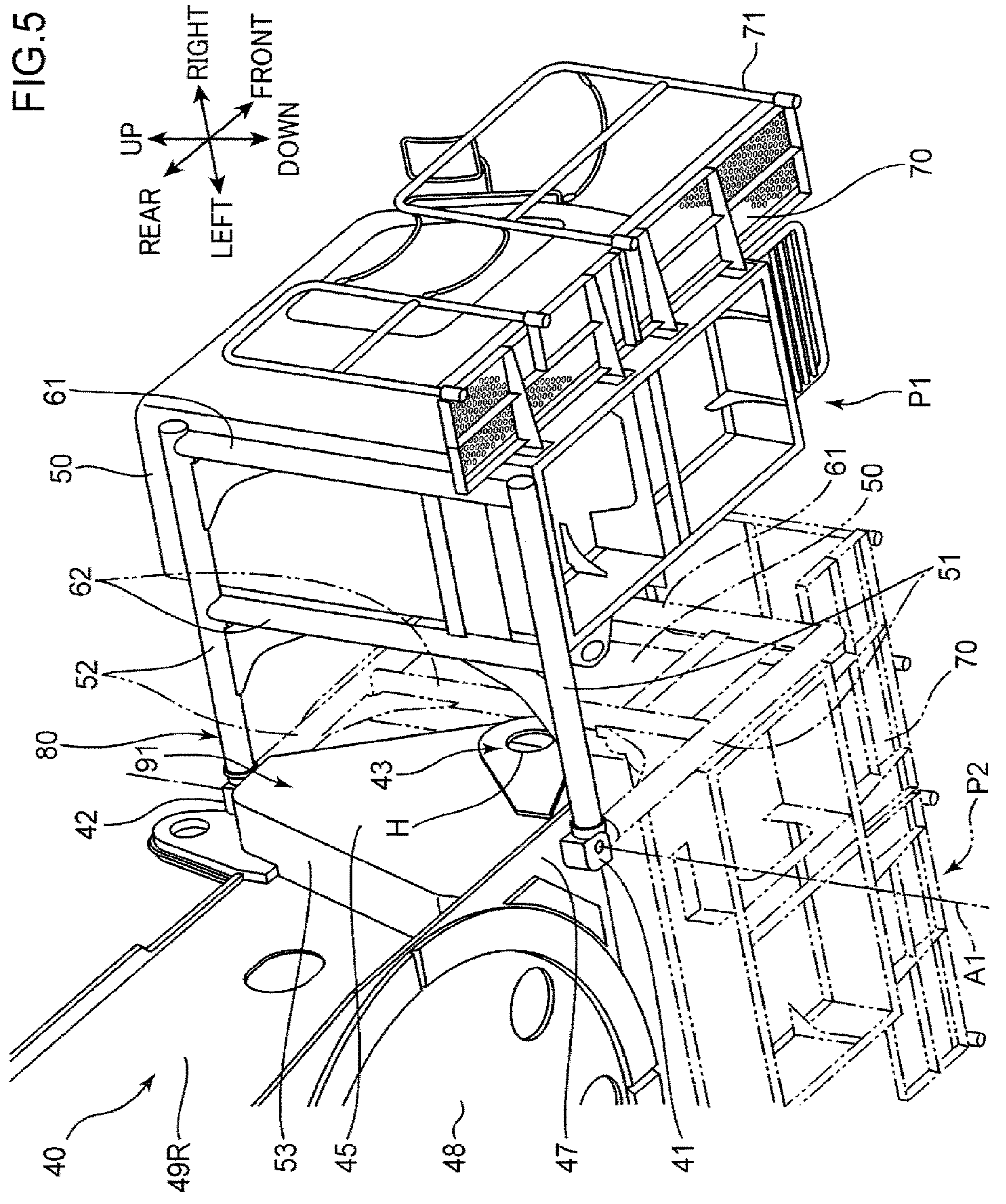
FIG. 5 is a perspective view of the slewing frame of the upper slewing body, the cab, and the connector that connects these components to each other.

Next, a connection structure of the slewing frame 40 and the cab 50 in the crane 100 according to the embodiment will be described. FIG. 2 is an enlarged side view of a part of the upper slewing body 20 of the crane 100. FIG. 3 is a plan view of the slewing frame 40 of the upper slewing body 20, the cab 50, and the connector 80 that connects these components to each other, and each of FIG. 4 and FIG. 5 is a perspective view thereof. FIG. 4 illustrates the slewing frame 40, the cab 50, and the connector 80 viewed from an upper right position. FIG. 5 illustrates the slewing frame 40, the cab 50, and the connector 80 viewed from a lower right position. FIG. 3 illustrates a boom arrangement region where the boom 30 is arranged in a crane operation in a plan view by the long dashed short dashed line, and illustrates the cab 50 in a transportation position P2 by the long dashed double-short dashed line.

The connector 80 is supported on the slewing frame 40 swingably to the slewing frame and the connector 80 supports the cab 50 in such a manner that a position of the cab 50 relative to the slewing frame 40 is changeable between the operation position P1 and the transportation position P2. The connector 80 swings about a swing axis A1 extending in the up-down direction.

The operation position P1 is a position of the cab 50 in the crane operation. The operation position P1 deviates outward (rightward in the embodiment) in the left-right direction from the right boom attachment parts 43R, 43R to avoid contact between the cab 50 and the boom in the crane operation. Specifically, the operation position P1 deviates in the left-right direction (a width direction of the boom 30) from a boom arrangement region R where the boom is arranged so that the cab 50 avoids overlapping the boom arrangement region R in the plan view in the crane operation, the operation position P1 being adjacent to the boom arrangement region R in the left-right direction (the width direction). The width direction of the boom 30 corresponds to the left-right direction.

The transportation position P2 is a position of the cab 50 in transportation of a part of the machine body including at least a front portion of the slewing frame 40, the cab 50, and the connector 80 in a state where the boom 30 is detached from the boom attachment parts 43R, 43L. The transportation position P2 is in front of the boom attachment parts 43R, 43L. The transportation position P2 is a position where at least a part of the cab 50 overlaps a region corresponding to the boom arrangement region R in a plan view.

The slewing frame 40 in FIG. 3 and FIG. 4 has a right plate 49R and a left plate 49L each extending along the bottom plate 48 in the front-rear direction and standing upward from the bottom plate 48. The right plate 49R and the left plate 49L are arranged at a distance therebetween in the left-right direction. The right plate 49R is a structural member located to the right of the center of the bottom plate 48 in the left-right direction, and the left plate 48L is a structural member located to the left of the center of the bottom plate 48.

As illustrated in FIG. 3, the slewing frame 40 includes a right support assembly 91 and a left support assembly 92. The right support assembly 91 and the left support assembly 92 tiltably support the boom 30. The right support assembly 91 swingably supports the connector 80. The right support assembly 91 serves as an example of the support assembly.

As illustrated in FIG. 3 to FIG. 5, the right support assembly 91 has a lower wall 47, an outer side wall 45, an inner side wall 44, an upper wall 46, and a rear wall 53.

The lower wall 47 constitutes a part of the bottom plate 48. The lower wall 47 is in the front of the bottom plate 48 and is a right portion of the bottom plate 48. In the embodiment, the lower wall 47 is in a portion around a diagonally forward right corner of the bottom plate 48. The lower wall 47 includes a part of a right edge of the bottom plate 48 extending in the front-rear direction.

The outer side wall 45 is a member extending along the lower wall 47 in the front-rear direction and standing upward from the lower wall 47. As illustrated in FIG. 3 and FIG. 4, the outer side wall 45 has a front portion protruding frontward farther than the lower wall 47.

The inner side wall 44 is a member extending along the lower wall 47 in the front-rear direction and standing upward from the lower wall 47. The inner side wall 44 is located at an inner position (the left side position in the embodiment) than the outer side wall 45 in the left-right direction at a distance from the outer side wall 45 in the left-right direction. As illustrated in FIG. 3, the inner side wall 44 has a front portion protruding frontward farther than the lower wall 47.

The upper wall 46 is a member supported by an upper portion of the outer side wall 45 and an upper portion of the inner side wall 44. That is to say, the upper wall 46 connects the upper portion of the outer side wall 45 and the upper portion of the inner side wall 44 to each other. The rear wall 53 is a member that connects a rear portion of the outer side wall 45 and a rear portion of the inner side wall 44 to each other As illustrated in FIG. 3, the left support assembly 92 has the same structure as the right support assembly 91. The left support assembly 92 has a lower wall 47, an outer side wall 45, an inner side wall 44, an upper wall 46, and a rear wall 53. The lower wall 47 of the left support assembly 92 constitutes a part of the bottom plate 48, and is in the front of the bottom plate 48 and is a left portion of the bottom plate 48. In the embodiment, the lower wall 47 of the left support assembly 92 is in a portion around a diagonally forward left corner of the bottom plate 48. The lower wall 47 of the left support assembly 92 includes a part of a left edge of the bottom plate 48 extending in the front-rear direction. The outer side wall 45, the inner side wall 44, the upper wall 46, and the rear wall 53 of the left support assembly 92 has the same configurations as those of the right support assembly 91 except that the components are arranged the other way round in the left-right direction in comparison with the components of the right support assembly 91.

As illustrated in FIG. 2 to FIG. 5, the connector 80 has a lower swing arm 51, an upper swing atm 52, and at least one connection arm. The connection arm serves as an example of the connection member.

The slewing frame 40 further has a lower arm attachment part 41 to which the lower swing arm 51 is attached and an upper arm attachment part 42 to which the upper swing arm 52 is attached. The lower at ni attachment part 41 is located below and in the rear of the pair of right boom attachment parts 43R, 43R, and the upper arm attachment part 42 is located above and in the rear of the pair of right boom attachment parts 43R, 43R. The lower arm attachment part 41 and the upper arm attachment part 42 overlap in the up-down direction in a plan view.

Specifically, the lower swing arm 51 of the connector 80 is attached to the lower arm attachment part 41 below the pair of right boom attachment parts 43R, 43R swingably about the swing axis A1 located behind the pair of right boom attachment parts 43R, 43R. The upper swing arm 52 of the connector 80 is attached to the upper arm attachment part 42 above the pair of right boom attachment parts 43R, 43R swingably about the swing axis A1. The lower swing arm 51 and the upper swing arm 52 are arranged at a distance therebetween in the up-down direction. The lower swing arm 51 and the upper swing arm 52 are located in the rear of the pair of right boom attachment parts 43R, 43R when the cab 50 is in the operation position P1. Such arrangement keeps the lower swing ami 51 and the upper swing arm 52 from coming into contact with the boom 30.

The two right boom attachment parts 43R, 43R are respectively formed in the front portion of the outer side wall 45 and in the front portion of the inner side wall 44 in the right support assembly 91. The two left boom attachment parts 43L, 43L are respectively formed in the front portion of the outer side wall 45 and in the front portion of the inner side wall 44 in the left support assembly 92. The pair of the right boom attachment parts 43R, 43R and the pair of left boom attachment parts 43L, 43L are at the same height positions and lie next to each other in a left-right direction at a distance therebetween in the left-right direction.

Specifically, one right boom attachment part 43R has an insertion hole H defined in the front portion of the outer side wall 45 of the right support assembly 91. The insertion hole H is a through hole extending through the front portion of the outer side wall 45 in the left-right direction. The other right boom attachment part 43R has an insertion hole H defined in the front portion of the inner side wall 44 of the right support assembly 91. The insertion hole H is a through hole extending through the front portion of the inner side wall 44 in the left-right direction.

Similarly, one left boom attachment part 43L has an insertion hole H defined in the front portion of the outer side wall 45 of the left support assembly 92. The insertion hole H is a through hole extending through the front portion of the outer side wall 45 in the left-right direction. The other left boom attachment part 43L has an insertion hole H defined in a front end of the inner side wall 44 of the left support assembly 92. The insertion hole H is a through hole extending through the front portion of the inner side wall 44 in the left-right direction. The proximal end of the boom 30 has an unillustrated insertion hole to align with the insertion holes H, H of the pair of right boom attachment parts 43R, 43R and with the insertion holes H, H of the pair of left boom attachment parts 43L, 43L for allowing an attachment member (e.g., a boom foot pin) to be inserted in the insertion holes. In this manner, the boom 30 is tiltably attached to the slewing frame 40.

In the embodiment shown in FIG. 3, the right boom attachment part 43R (specifically, the insertion hole H of the right boom attachment part 43R) formed in the front portion of the outer side wall 45 is an arrangeable in front of the swing axis A1 and outward or rightward from the swing axis A1 in the left-right direction. Such arrangement achieves suppression of a decrease in the distance between the right boom attachment parts 43R, 43R and the left boom attachment parts 43L, 43L in the left-right direction. This leads to suppression of a reduction in the hoisting performance of the crane 100.

In the embodiment, the right boom attachment parts 43R, 43R are respectively formed in the front portion of the outer side wall 45 and in the front portion of the inner side wall 44 in the right support assembly 91, the lower arm attachment part 41 is provided on the lower wall 47 in the rear of the front portion of the outer side wall 45 and the front portion of the inner side wall 44, and the upper arm attachment part 42 is provided on an upper portion (the upper wall 46 in the embodiment) of the support assembly in the rear of the front portion of the outer side wall 45 and the front port of the inner side wall 44. This allows the swing axis A1 to be located between an outer surface (right surface) of the outer side wall 45 and an inner surface (left surface) of the inner side wall 44, and behind the front portion of the outer side wall 45 and the front portion of the inner side wall 44. In other words, the swing axis A1 is locatable substantially directly behind the right boom attachment parts 43R, 43R.

Each of the lower swing arm 51 and the upper swing arm 52 has one end and the other end in a longitudinal direction thereof. The one end of the lower swing arm 51 is attached to the lower arm attachment part 41 of the slewing frame 40 rotatably about the swing axis A1, and the one end of the upper swing arm 52 is attached to the upper arm attachment part 42 of the slewing frame 40 rotatably about the swing axis A1. Specific examples will be described below.

Figure 6:
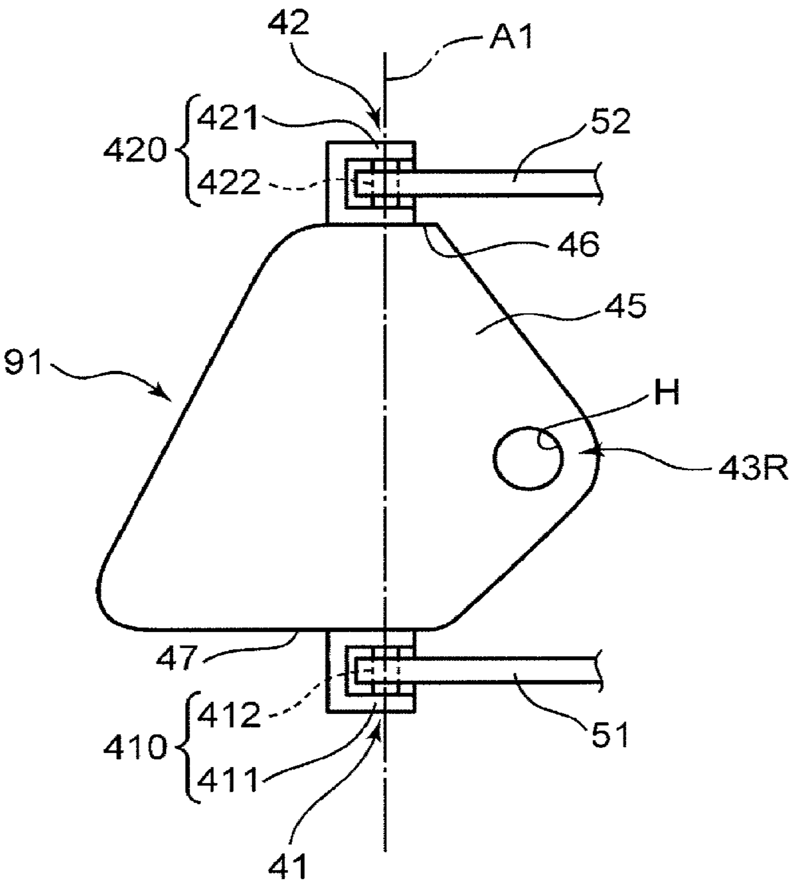
FIG. 6 is a schematic side view illustrating a lower arm attachment part and an upper alto attachment part of the stewing frame.

FIG. 6 is a schematic side view illustrating the lower arm attachment part 41 and the upper arm attachment part 42 of the slewing frame 40. As shown in FIG. 6, the lower arm attachment part 41 includes a support member 410 provided on the lower wall 47 of the right support assembly 91. The support member 410 supports the one end of the lower swing arm 51 in such a manner that the lower swing arm 51 is swingable about the swing axis A1. Similarly, the upper arm attachment part 42 includes a support member 420 provided on the upper wall 46 of the right support assembly 91. The support member 420 supports the one end of the upper swing arm 52 in such a manner that the upper swing arm 52 is swingable about the swing axis A1.

Specifically, the support member 410 has a bracket 411 connected to a lower surface of the lower wall 47, and a pin 412 supported by the bracket 411 and extending in the up-down direction. The one end of the lower swing arm 51 has a through hole for allowing the pin 412 to be inserted therethrough. The pin 412 is supported by the bracket 411 in a state of being inserted through the through hole. Consequently, the lower swing arm 51 is attached to the lower arm attachment part 41 below the pair of right boom attachment parts 43R, 43R swingably about the swing axis A1.

Similarly, the support member 420 has a bracket 421 connected to an upper surface of the upper wall 46, and a pin 422 supported by the bracket 421 and extending in the up-down direction. The one end of the upper swing arm 52 has a through hole for allowing the pin 422 to be inserted therethrough. The pin 422 is supported by the bracket 421 in a state of being inserted through the through hole. Consequently, the upper swing arm 52 is attached to the upper arm attachment part 42 above the pair of right boom attachment parts 43R, 43R swingably about the swing axis A1 shared with the lower swing arm 51.

In the embodiment shown in FIG. 3 to FIG. 5, each of the lower swing arm 51 and the upper swing arm 52 is a long and thin member extending in one direction. Each of the lower swing atm 51 and the upper swing atm 52 may be a hollow member like a pipe, or a solid member. In the embodiment, each of the lower swing atm 51 and the upper swing arm 52 has a columnar shape extending in one direction, but may have another shape other than the columnar shape, or may not necessarily linearly extend in such one direction.

Each of the lower swing arm 51 and the upper swing arm 52 has a posture extending from the one end to the other end in a horizontal direction. However, each of the lower swing arm 51 and the upper swing arm 52 may not necessarily extend in the horizontal direction, but may extend in a direction at an angle to the horizontal direction. Each of the lower swing arm 51 and the upper swing arm 52 may not necessarily extend in the one direction, and may extend in a different direction midway.

Each of the lower swing arm 51 and the upper swing arm 52 has a posture extending from the one end in the left-right direction (rightward in the specific example shown in FIG. 3) when the cab 50 is in the operation position P1, and has another posture extending from the one end in the front-rear direction (frontward in the specific example shown in FIG. 3) when the cab 50 is in the transportation position P2. In the embodiment, the lower swing arm 51 is arranged just below the right boom attachment parts 43R, 43R and the upper swing arm 52 is arranged just above the right boom attachment parts 43R, 43R when the cab 50 is in the transportation position P2.

In the embodiment, the at least one connection arm includes a first connection arm 61 and a second connection arm 62. Each of the first connection arm 61 and the second connection arm 62 is a long and thin member extending in the up-down direction. Each of the first connection arm 61 and the second connection arm 62 may be a hollow member like a pipe, or a solid member. In the embodiment, each of the first connection arm 61 and the second connection arm 62 has a columnar shape extending in the up-down direction, but may have another shape except the columnar shape, or may not necessarily linearly extend in such one direction.

The first connection arm 61 connects the other end of the lower swing arm 51 and the other end of the upper swing arm 52 to each other. The second connection arm 62 connects an intermediate portion of the lower swing arm 51 between the one end and the other end thereof and an intermediate portion of the upper swing arm 52 between the one end and the other end thereof to each other.

Each of the first connection arm 61 and the second connection arm 62 is arranged at such a position as to avoid contact with the right support assembly 91 including the right boom attachment parts 43R, 43R in each time when the cab 50 is in the operation position P1, when the cab 50 is in the transportation position P2, and when the cab 50 shifts between the operation position P1 and the transportation position P2. The lower swing atm 51, the upper swing arm 52, the second connection arm 62, and a portion of the right support assembly 91 between the lower arm attachment part 41 and the upper arm attachment part 42 define an enough space to keep the connector 80 from coming into contact with the right support assembly 91 including the right boom attachment parts 43R, 43R when the cab 50 is in any position between the operation position P1 and the transportation position P2.

In the embodiment, the connector 80 having the lower swing arm 51, the upper swing arm 52, the first connection arm 61, and the second connection arm 62 is located in the rear of the cab and the cab 50 has a rear portion connected to at least a part of the connector 80 so that the cab is supported by the connector 80. Specifically, in the embodiment, the connector 80 has a lower connection part 81 for connecting the lower swing thin 51 to the cab 50, and an upper connection part 82 for connecting the upper swing arm 52 to the cab 50. The lower connection part 81 is connected to a lower portion of the cab 50, and the upper connection part 82 is connected to the cab 50 at a position higher than the center of the cab in a height direction of the cab 50.

In the embodiment shown in FIG. 6, an operator can manually shift the cab 50 between the operation position P1 and the transportation position P2. However, the crane 100 is not limited to this embodiment. The crane 100 may further include a swing drive mechanism that allows the lower swing arm 51 and the upper swing arm 52 of the connector 80 to swing about the swing axis A1 to the stewing frame 40. Specific examples will be described below.

Figure 7:
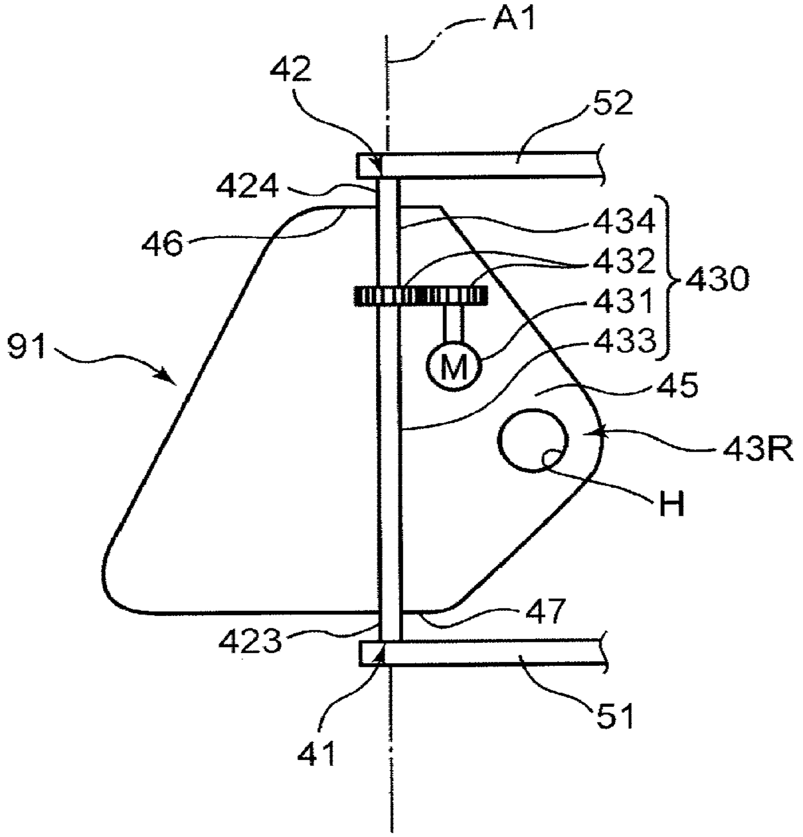
FIG. 7 is a schematic side view illustrating a lower arm attachment part and an upper arm attachment part of a slewing frame, and a swing drive mechanism, each included in a crane according to a first modification of the embodiment.

FIG. 7 is a schematic side view illustrating a lower at in attachment part 41 and an upper arm attachment part 42 of a slewing frame 40, and a swing drive mechanism 430, each included in a crane according to a first modification of the embodiment. In the crane according to the first modification shown in FIG. 7, the swing drive mechanism 430 includes: a motor 431, such as a hydraulic motor or an electrically driven motor, for enabling a lower swing arm 51 and an upper swing arm 52 to swing about a swing axis A1 to the slewing frame 40; and a transmitter that transmits a rotational force of the motor 431 to the lower swing arm 51 and the upper swing arm 52. Although the specific configuration of the transmitter is not particularly limited, the transmitter in the specific example shown in FIG. 7 includes gears 432, 432, and drive shafts 433, 434.

The lower arm attachment part 41 to which the lower swing arm 51 is attached is provided to a lower wall 47 of a right support assembly 91, and the upper arm attachment part 42 to which the upper swing arm 52 is attached is provided to an upper wall 46 of the right support assembly 91 in the first modification as well. The lower arm attachment part 41 is located below and in the rear of a pair of right boom attachment parts 43R, 43R and the upper arm attachment part 42 is located above and in the rear of the pair of right boom attachment parts 43R, 43R. The lower arm attachment part 41 may include, for example, a shaft 423 for connecting one end of the lower swing aria 51 and the transmitter (e.g., the drive shaft 433) to each other. The lower arm attachment part 41 may include an unillustrated bearing for supporting the shaft 423. The upper arm attachment part 42 may include, for example, a shaft 424 for connecting one end of the upper swing arm 52 and the transmitter (e.g., the drive shaft 434) to each other. The upper arm attachment part 42 may include an unillustrated bearing for supporting the shaft 424.

The swing drive mechanism may include, for example, a cylinder (e.g., a hydraulic cylinder) for enabling the lower swing arm 51 and the upper swing arm 52 to swing about the swing axis A1 to the slewing frame 40. In this case, the cylinder has one end rotatably connected to at least one of the lower swing atm 51 and the upper swing arm 52, and another end connected to the slewing frame 40. The cylinder is contractable and extendable. The cab 50 comes to an operation position P1 when the cylinder is extended to a predetermined position, and the cab 50 comes to a transportation position P2 when the cylinder is contracted to a predetermined position.

In the embodiment, the crane 100 further includes a work platform 70 and a fence 71 provided on a specific side of the cab 50 (right side of the cab 50 in the embodiment) for an operator. The work platform 70 and the fence 71 are fixedly attached to a specific side portion (right side portion) of the cab 50, but are shiftable in accordance with shifting of the cab 50 between the operation position P1 and the transportation position P2. The work platform 70 and the fence 71 are excludable.

As described heretofore, the crane 100 according to the embodiment permits the lower swing arm 51 and the upper swing arm 52 that support the cab 50 to share a load to be received from the cab 50, and thus, the connector 80 as a whole easily ensures enough strength to support the cab 50. In addition, it is possible to make at least the dimension of the lower swing arm 51 in the height direction smaller than the dimension of a conventional one while ensuring the strength to support the cab 50. This configuration with such a smaller dimension of the lower swing arm 51 in the height direction achieves a lower height position of each of the boom attachment parts 43R, 43L located above the lower swing arm 51 and a lower height position of the proximal end of the boom 30 to be attached to the boom attachment parts 43R, 43L than a conventional configuration. The configuration attains a smaller force (acting force) acting from the boom 30 onto the boom attachment parts 43R, 43L than a conventional configuration, and achieves suppression of an increase in each of the dimension and the weight of each of the boom attachment parts 43R, 43L. The upper swing arm 52 swingably attached to the upper arm attachment part 42 above the right boom attachment parts 43R, 43R is at such a position as to deviate from the boom arrangement region R in the left-right direction (width direction) when the cab 50 is in the operation position P1. Thus, the upper swing arm 52 avoids hindering the tilting action of the boom 30 in the crane operation. From these perspectives, the crane 100 enables changing of the position of the cab 50 relative to the slewing frame 40 between the operation position P1 and the transportation position P2 while ensuring enough strength to support the cab 50 without allowing each of the boom attachment parts 43R, 43L to be at a higher height position, and further prevents the upper swing arm 52 from hindering the tilting action of the boom 30 in the crane operation.

Both the lower swing arm 51 and the upper swing arm 52 are connected to the cab 50 respectively via the lower connection part 81 and the upper connection part 82 in the embodiment, and thus, the load shared by the connection parts results in being smaller than a load in a configuration where the connector 80 is connected to the cab 50 via only one of the connection parts that receives the load.

In the embodiment, the lower swing arm 51 extends from the lower arm attachment part 41 and is connected to the lower portion of the cab 50, and the upper swing arm 52 extends from the upper arm attachment part 42 at a position higher than the center of the cab 50 in the height direction of the cab. This configuration attains a relatively long distance between the lower swing arm 51 and the upper swing arm 52 in the up-down direction, and thus achieves less contact between: members arranged around the lower swing arm 51 and the upper swing arm 52, such as a boom foot pin and a driving device therefor: and the lower swing arm 51 and the upper swing arm 52.

In the embodiment, the connector 80 further has the connection arms 61, 62 each extending from the lower swing arm 51 to the upper swing arm 52 to connect the lower swing arm 51 and the upper swing arm 52 to each other. Each of the connection arms 61, 62 is arranged at such a position as to avoid contact with each of the right boom attachment parts 43R, 43R when the cab 50 shifts between the operation position P1 and the transportation position P2. In this manner, the connection arms 61, 62 can increase the stiffness of the connector 80 without hindering the shifting of the cab 50 between the operation position P1 and the transportation position P2.

In the embodiment, the stewing frame 40 includes the right support assembly 91 having the lower wall 47 and the outer side wall 45, each of the right boom attachment parts 43R, 43R is faulted in the front portion of the outer side wall 45, the lower arm attachment part 41 is provided on the lower wall 47 in the rear of the front portion of the outer side wall 45, and the upper arm attachment part 42 is provided on a top of the right support assembly 91 in the rear of the front portion of the outer side wall 45. This succeeds in collectively arranging the right boom attachment parts 43R, 43R, the lower arm attachment part 41, and the upper arm attachment part 42 in the right support assembly 91 while realizing the above-described positional relationship among the right boom attachment parts 43R, 43R, the lower arm attachment part 41, and the upper arm attachment part 42 in the up-down direction and the front-rear direction.

In the embodiment, the right support assembly 91 further has: the inner side wall 44; and the upper wall 46 supported by the upper portion of the outer side wall 45 and the upper portion of the inner side wall 44, and the upper arm attachment part 42 is provided on the upper wall 46. The right support assembly 91 therefore can more stably support the upper alto attachment part 42 and the upper swing arm 52 attached thereto.

The present disclosure should not be limited to the embodiment described above. The disclosure includes, for example, aspects to be described below.

(A) Positions of the Frame and the Cab Relative to Each Other

The cab 50 deviates rightward from the frame 40 in the operation position P1 in the embodiment, but may deviate leftward from the frame 40.

(B) Portion of the Cab to be Supported by the Connector

The lower connection part 81 and the upper connection part 82 of the connector 80 respectively connect the lower swing arm 51 and the upper swing arm 52 to the rear portion of the cab 50 in the embodiment, but may connect the lower swing arm 51 and the upper swing arm 52 to a middle portion of the cab 50 in the front-rear direction. One of the lower connection part 81 and the upper connection part 82 is excludable.

(C) Connection Member

The connector 80 has the connection arms 61, 62 each serving as the connection member in the embodiment, but is not limited to this aspect, and at least one of the arms is excludable.

The connector 80 has the first connection arm 61 and the second connection arm 62 in the embodiment, but is not limited to this aspect, and the following modification may be adopted. A connector may have three or more connection arms. Each connection arm may not necessarily extend in a vertical direction, and may extend in a diagonal direction at an angle to the vertical direction. The connection arm may have a portion extending in a first direction (e.g., vertical direction) and another portion extending in a direction (e.g., diagonal direction) different from the first direction.

Each of the connection arms 61, 62 extends along a back surface of the cab 50 in the up-down direction in the embodiment, but is not limited to this aspect. A connection member, such as a connection arm, may be arranged in a region between a cab and a swing axis A1 in a back view of the cab in the operation position.

The connection member of the connector may not be a rod-shaped member like the first connection arm 61 and the second connection arm 62. For instance, the connection member may be a plate-shaped member for connecting the lower swing arm and the upper swing arm to each other in the up-down direction. The plate-shaped connection member is arranged at such a position as to avoid contact with the first boom attachment part when the cab shifts between the operation position and the transportation position in this case as well.

(D) Kind of the Crane

The crane is a mobile crane including a lower traveling body in the embodiment, but is not limited thereto, and may be a stationary crane that supports a boom tiltably to a base arranged on the ground. In this case, the base constitutes a machine body.

Although the crane includes the boom 30 and the jib 35 in the embodiment, the crane may include only the boom 30 without the jib 35.

(E) Boom Attachment Part

Although the frame has the pair of right boom attachment parts 43R, 43R and the pair of left boom attachment parts 43L, 43L in the embodiment, but it is only required that the frame has at least one right boom attachment part 43R and at least one left boom attachment part 43L.

The inner side wall 44 of the right support assembly 91 is independent of the right plate 49R as illustrated in FIG. 3 in the embodiment, but may constitute a part of the right plate 49R, i.e., a front portion of the right plate 49R. Similarly, the inner side wall 44 of the left support assembly 92 is independent of the left plate 49L, but may constitute a part of the left plate 49L, i.e., a front portion of the left plate 49L.

(F) Lower Swing Arm and the Upper Swing Arm

Although each of the lower swing arm 51 and the upper swing arm 52 has a pipe shape in the embodiment, at least one of the lower swing arm 51 and the upper swing arm 52 may not have the pipe shape but have another shape, for example, a plate shape.

The lower swing arm 51 and the upper swing arm 52 respectively extend from the lower arm attachment part 41 and the upper arm attachment part 42 to an outer end (right end in FIG. 4) in the left-right direction on a back surface of the cab 50 in the embodiment, but are not limited to this aspect. For instance, at least one of the lower swing arm 51 and the upper swing arm 52 may extend to the middle portion of the cab between a left end and the right end thereof without reaching the right end. Alternatively, one of the lower swing aini 51 and the upper swing aiiii 52 may be connected to the other of the lower swing arm 51 and the upper swing arm 52 without reaching the back surface of the cab 50.

Figure 8:
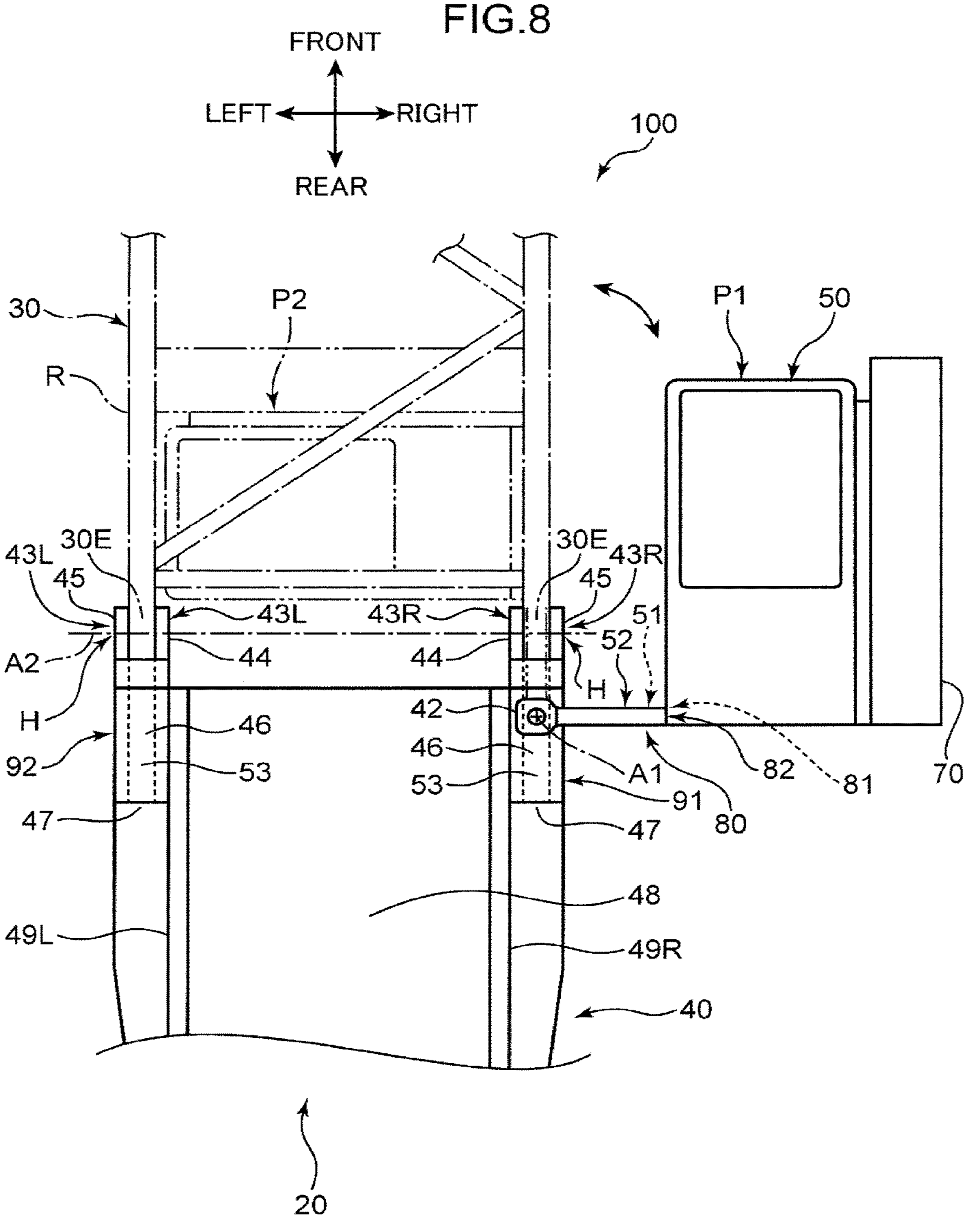
FIG. 8 is a plan view of a stewing frame, a connector, and a cab each included in a crane according to a second modification of the embodiment.

Each of the lower swing arm 51 and the upper swing arm 52 is connected to the back surface of the cab 50, but is not limited to this aspect. FIG. 8 is a plan view of a slewing frame 40, a connector 80, and a cab 50 each included in a crane 100 according to a second modification of the embodiment. In the second modification shown in FIG. 8, a lower swing aini 51 and an upper swing arm 52 respectively extend from a lower arm attachment part 41 and an upper arm attachment part 42 to the cab 50, and are connected to a left surface of the cab 50. The lower swing arm 51 may be connected to, for example, a left surface of a cab deck (base) constituting a lower portion of the cab 50, and the upper swing arm 52 may be connected to, for example, an upper section of the left surface of the cab 50 at a higher position than the cab deck.

A reinforcement member like a rib may be provided between a connection arm and at least one of the lower swing arm 51 and the upper swing arm 52. A reinforcement member like a rib may be provided between the cab 50 and at least one of the lower swing arm 51 and the upper swing arm 52.

This disclosure provides a crane that enables changing of a position of a cab relative to a frame of an upper slewing body between an operation position and a transportation position while ensuring enough strength to support the cab without allowing a boom attachment part to be at a higher height position.

Provided is a crane including: a machine body including a frame, a cab, and a connector that connects the frame and the cab to each other, the frame having a first boom attachment part and a second boom attachment part lying next to each other at a distance therebetween in a left-right direction; and a boom having a proximal end attached to the first boom attachment part and the second boom attachment part tiltably to the machine body. The connector is supported on the frame swingably to the frame, and the connector supports the cab in such a manner that a position of the cab relative to the frame is changeable between an operation position and a transportation position. The operation position is a position of the cab in a crane operation and deviates outward in the left-right direction from the first boom attachment part to avoid contact between the cab and the boom in the crane operation. The transportation position is a position of the cab in transportation of a part of the machine body including the cab, the connector, and at least a portion of the frame in a state where the boom is detached from the first boom attachment part and the second boom attachment part, the transportation position being in front of the first boom attachment part. The frame further has a lower arm attachment part located below and in the rear of the first boom attachment part and an upper arm attachment part located above and in the rear of the first boom attachment part. The connector has a lower swing arm attached to the lower arm attachment part below the first boom attachment part swingably about a swing axis located behind the first boom attachment part and an upper swing arm attached to the upper arm attachment part above the first boom attachment part swingably about the swing axis, the upper swing arm being at such a position as to avoid contact with the boom when the cab is in the operation position.

This crane permits the lower swing arm and the upper swing arm of the connector that supports the cab to share a load to be received from the cab, and thus, the connector as a whole easily ensures enough strength to support the cab. In addition, it is possible to make at least the dimension of the lower swing arm in the height direction smaller than the dimension of a conventional one while ensuring the strength to support the cab. This configuration with such a smaller dimension of the lower swing arm in the height direction achieves a lower height position of the first boom attachment part located above the lower swing arm and a lower height position of the proximal end of the boom to be attached to the first boom attachment part than a conventional configuration. The configuration attains a smaller force (acting force) acting from the boom onto the first boom attachment part and the second boom attachment part than a conventional configuration, and achieves suppression of an increase in each of the dimension and the weight of each of these boom attachment parts. The upper swing arm swingably attached to the upper arm attachment part above the first boom attachment part is at such a position as to avoid contact between the upper swing arm and the boom when the cab is in the operation position. Thus, the upper swing arm avoids hindering the tilting action of the boom in the crane operation. From these perspectives, the crane enables changing of the position of the cab relative to the frame of the upper slewing body between the operation position and the transportation position while ensuring the strength to support the cab without allowing the boom attachment part to be at a higher height position, and further prevents the upper swing arm from hindering the tilting action of the boom in the crane operation.

In the crane, the lower arm attachment part to which the lower swing arm is swingably attached is provided below and in the rear of the first boom attachment part, and the upper aiiu attachment part to which the upper swing arm is swingably attached is provided above and in the rear of the first boom attachment part. Such arrangement achieves suppression of a decrease in a distance between the first boom attachment part and the second boom attachment part in the left-right direction, and suppression of an increase in a length of a part of the machine body including at least a portion of the frame, the cab, and the connector in the front-rear direction in transportation of the part of the machine body. Hereinafter, more details will be described.

If an arm attachment part to which a swing arm is swingably attached is, for example, adjacent to a first boom attachment part in the left-right direction in a plan view, the first boom attachment part is required to be arranged at an inner position than the arm attachment part in the left-right direction to avoid contact between the first boom attachment part and the arm attachment part. In this case, the distance between the first boom attachment part and the second boom attachment part in the left-right direction decreases. The decrease causes a reduction in the hoisting performance of the crane. Alternatively, if the arm attachment part to which the swing arm is swingably attached is provided, for example, in front of the first boom attachment part in a plan view, it is necessary to ensure a space between the cab in the transportation position and the frame for allowing the arm attachment part to be placed therein. In this case, the distance between the cab in the transportation position and the frame in the front-rear direction increases. The increase results in an increase in the length of a part of the machine body including these portion and components in the front-rear direction in transportation of the part of the machine body.

By contrast, the crane according to this disclosure includes the lower arm attachment part located below and in the rear of the first boom attachment part, and the upper arm attachment part located above and in the rear of the first boom attachment part. In this crane, the first boom attachment part is less likely to come into contact with the lower arm attachment part and the upper arm attachment part in the left-right direction. Thus, the first boom attachment part is not required to be arranged at an inner position in the left-right direction. Therefore, a decrease in the distance between the first boom attachment part and the second boom attachment part in the left-right direction is suppressible. This leads to suppression of a reduction in the hoisting performance of the crane. Furthermore, in this crane, it is unnecessary to ensure a space between the cab in the transportation position and the frame for allowing the lower arm attachment part and the upper arm attachment part to be placed therein. This attains suppression of an increase in the distance between the cab in the transportation position and the frame in the front-rear direction. The suppression leads to successful suppression of an increase in a length of a part of the machine body including at least a portion of the frame, the cab, and the connector in the front-rear direction in transportation of the part of the machine body.

In the crane, the connector preferably has a lower connection part for connecting the lower swing arm to the cab, and an upper connection part for connecting the upper swing arm to the cab.

Both the lower swing arm and the upper swing arm are connected to the cab respectively via the lower connection part and the upper connection part in this aspect, and thus, a load applied to each of the connection parts results in being smaller than a load in a configuration where the connector is connected to the cab via only one of the connection parts.

In the crane, it is preferable that the connector further has a connection member for connecting the lower swing arm and the upper swing arm to each other, and the connection member is arranged at such a position as to avoid contact with the first boom attachment part when the cab shifts between the operation position and the transportation position.

In this aspect, the connection member can increase the stiffness of the connector without hindering the shifting of the cab between the operation position and the transportation position.

In the crane, it is preferable that the lower swing arm extends from the lower attachment part and is connected to a lower portion of the cab, and the upper swing arm extends from the upper arm attachment part at a position higher than the center of the cab in a height direction of the cab.

This aspect attains a relatively long distance between the lower swing arm and the upper swing arm in the up-down direction, and thus achieves less contact between: members arranged around the lower swing arm and the upper swing arm, such as a boom foot pin and a driving device therefor; and the lower swing arm and the upper swing arm.

In the crane, it is preferable that the frame has a bottom plate extending in a front-rear direction, the frame includes a support assembly having a lower wall and a side wall, the lower wall being in the front of the bottom plate and being an outside portion of the bottom plate in the left-right direction, the side wall extending along the lower wall in the front-rear direction and standing upward from the lower wall, the first boom attachment part is formed in a front portion of the side wall, the lower arm attachment part is provided on the lower wall and in the rear of the front portion of the side wall, and the upper arm attachment part is provided on an upper portion of the support assembly and in the rear of the front portion of the side wall.

In this configuration, the first boom attachment part is formed in the front portion of the side wall of the support assembly, the lower arm attachment part is provided on the lower wall and in the rear of the front portion of the side wall, and the upper arm attachment part is provided on the upper portion of the support assembly and in the rear of the front portion of the side wall. This succeeds in collectively arranging the first boom attachment part, the lower arm attachment part, and the upper arm attachment part in the support assembly while realizing the above-described positional relationship among the first boom attachment part, the lower arm attachment part, and the upper arm attachment part in the up-down direction and the front-rear direction.

In the crane, it is preferable that the side wall is an outer side wall, the support assembly has: an inner side wall standing upward from the lower wall of the bottom plate and located at an inner position than the outer side wall in the left-right direction; and an upper wall supported by an upper portion of the outer side wall and an upper portion of the inner side wall, and the upper arm attachment part is attached to the upper wall.

In this configuration, the upper arm attachment part is provided on the upper wall supported by the outer side wall and the inner side wall. The support assembly therefore can more stably support the upper arm attachment part and the upper swing arm attached thereto.

The invention claimed is:

1. A crane, comprising:

a machine body including a frame, a cab, and a connector that connects the frame and the cab to each other, the frame having a first boom attachment part and a second boom attachment part lying next to each other at a distance therebetween in a left-right direction; and a boom having a proximal end attached to the first boom attachment part and the second boom attachment part tiltably to the machine body, wherein the connector is supported on the frame swingably to the frame, and the connector supports the cab in such a manner that a position of the cab relative to the frame is changeable between an operation position and a transportation position, the operation position being a position of the cab in a crane operation and deviating outward in the left-right direction from the first boom attachment part to avoid contact between the cab and the boom in the crane operation, the transportation position being a position of the cab in transportation of a part of the machine body including the cab, the connector, and at least a portion of the frame in a state where the boom is detached from the first boom attachment part and the second boom attachment part, the transportation position being in front of the first boom attachment part, the frame further has a lower arm attachment part located below and in the rear of the first boom attachment part and an upper arm attachment part located above and in the rear of the first boom attachment part, and the connector has a lower swing arm attached to the lower arm attachment part below the first boom attachment part swingably about a swing axis located behind the first boom attachment part and an upper swing arm attached to the upper arm attachment part above the first boom attachment part swingably about the swing axis, the upper swing arm being at such a position as to avoid contact with the boom when the cab is in the operation position.

2. The crane according to claim 1, wherein the connector has a lower connection part for connecting the lower swing arm to the cab, and an upper connection part for connecting the upper swing arm to the cab.

3. The crane according to claim 1, wherein the connector further has a connection member for connecting the lower swing arm and the upper swing arm to each other, and the connection member is arranged at such a position as to avoid contact with the first boom attachment part when the cab shifts between the operation position and the transportation position.

4. The crane according to claim 1, wherein the lower swing arm extends from the lower attachment part and is connected to a lower portion of the cab, and the upper swing arm extends from the upper arm attachment part at a position higher than the center of the cab in a height direction of the cab.

5. The crane according to claim 1, wherein the frame has a bottom plate extending in a front-rear direction, the frame includes a support assembly having a lower wall and a side wall, the lower wall being in the front of the bottom plate and being an outside portion of the bottom plate in the left-right direction, the side wall extending along the lower wall in the front-rear direction and standing upward from the lower wall, the first boom attachment part is formed in a front portion of the side wall, the lower arm attachment part is provided on the lower wall and in the rear of the front portion of the side wall, and the upper arm attachment part is provided on an upper portion of the support assembly and in the rear of the front portion of the side wall.

6. The crane according to claim 5, wherein the side wall is an outer side wall, the support assembly has:

an inner side wall standing upward from the lower wall of the bottom plate and located at an inner position than the outer side wall in the left-right direction; and an upper wall supported by an upper portion of the outer side wall and an upper portion of the inner side wall, and the upper arm attachment part is attached to the upper wall.

* * * * *